United States Patent

Ijsseldijk et al.

[11] Patent Number: 5,472,718
[45] Date of Patent: Dec. 5, 1995

[54] CHEESE PRODUCT AND METHOD OF PREPARING

[75] Inventors: Yvon M. Ijsseldijk, Rotterdam; Jacqueline A. Lanting-Marijs; Feico Lanting, both of Maassluis, all of Netherlands

[73] Assignee: Van den Bergh Foods Co., Division of Conopco, Inc., Lisle, Ill.

[21] Appl. No.: 190,097

[22] PCT Filed: Jul. 31, 1992

[86] PCT No.: PCT/EP92/01775

§ 371 Date: Feb. 2, 1994

§ 102(e) Date: Feb. 2, 1994

[87] PCT Pub. No.: WO93/02565

PCT Pub. Date: Feb. 18, 1993

[30] Foreign Application Priority Data

Aug. 2, 1991 [NL] Netherlands ............ 9101341
Aug. 8, 1991 [NL] Netherlands ............ 9101364

[51] Int. Cl.⁶ ................................ A23C 19/032
[52] U.S. Cl. .................. 426/38; 426/40; 426/43; 426/582
[58] Field of Search ............... 426/38, 40, 43, 426/582

[56] References Cited

U.S. PATENT DOCUMENTS 2,793,122  5/1957  Erekson .
3,674,508  7/1972  Kasik et al. ............... 426/582
4,476,143  11/1984  Czulak et al. .

FOREIGN PATENT DOCUMENTS 0281167  9/1988  European Pat. Off. .
0359295  3/1990  European Pat. Off. .
2112160  6/1972  France .

OTHER PUBLICATIONS

International Search Report in the counterpart International Application PCT/EP92/01775.
Guyonnet, J. "Un fromage pour les PVD", Revue Laitère Française, No. 445, Oct. 1985, pp. 56–57.
Food and Science Technologie Abstracts, vol. 24, No. 8, 1975, pp. 6–8.

*Primary Examiner*—Helen Pratt
*Attorney, Agent, or Firm*—Rimma Mitelman

[57] ABSTRACT

Milk is curdled by adding a suitable coagulant, other additives optionally also being added, and a mesophilic starter culture is applied,
after curdling, cutting the curd formed and separating off the whey, and
pressing the cheese mass, wherein
live yoghurt bacteria are added to the milk, such as *Streptococcus thermophilus* and *Lactobacillus bulgaricus* in a weight ratio of mesophilic culture to yoghurt culture of 0.30 to 0.02 and preferably 0.1 to 0.04. The cheese product possesses a Gaba/Glu (gamma amino butyric acid/glutamic acid) ratio of at least 0.1 and preferably 0.25. The cheese product comprises eyes with a total volume of at least 4% (w/w) of the total cheese volume.

13 Claims, No Drawings

CHEESE PRODUCT AND METHOD OF PREPARING

The present invention firstly relates to a method for preparing a hard or semi-hard cheese product, at least comprising the following steps:
  allowing milk to curdle by adding a suitable coagulant, other customary additives optionally also being added, and wherein a mesophilic starter culture is applied,
  after curdling, cutting the curd formed and separating off the whey, and
  pressing cheeses,
wherein in addition to the starter culture yoghurt comprising live yoghurt bacteria is added to the milk, the method being characterised in that the yoghurt culture comprises *Streptococcus thermophilus* and *Lactobacillus bulgaricus* in a weight ratio of mesophilic culture to yoghurt bacteria from 0.30 to 0.02.

Cheese products prepared by the above method have a number of advantageous characteristics, including a smooth texture and a pleasant refreshing tart, sweet, nutty and strong taste. The cross section of the product also has the striking apppearance because of the presence of relatively large holes.

Milk is used primarily to indicate conventional cows milk, but is also used to indicate cows milk treated in any way involving, for example, at least partial removal of the fat or its replacement by other fats and/or oils, for example of vegetable origin.

The invention is not limited to the addition of yoghurt for providing the yoghurt bacteria, but also encompasses a method in which such yoghurt is prepared in situ by addition of suitable microorganisms. Preferably the mesophilic culture/yoghurt bacteria ratio is 0.1 to 0.04.

An example of a mesophilic culture is the so called BOS-culture (available from Nederlands Instituut voor Zuivelonderzoek) used in the examples. Other well known mesophilic cultures are also suitable for the purpose of the invention.

Yoghurt to provide for the yoghurt culture is preferably added in an amount of 5 to 25% by weight, more preferably 8–15% by weight and in particular 10% by weight of the total mass.

It has been found that the quality of the cheese products declined when more than 25% by weight of an acidified milk product was added in the preparation thereof.

Yoghurt usually has a pH value which is between 3.5 and 5 and contains $10^7$ to $10^9$ micro-organisms per gram.

The use of yoghurt in the preparation of cheese products is found appreciably to shorten the time needed for the so-called "acidification". Acidification means allowing a cheese to stand after it has been pressed, in order to allow it to acidify to a suitable pH. The cheese is then salted, usually in a brine bath.

To improve the taste of the cheese products prepared by the method according to the invention the mesophilic culture preferably comprises at least one aroma former. Examples of such aroma formers are *Leuconostoc cremoris* and *Streptococcus diacetylactus*.

Advantageously prior to addition to the cheese milk, the yoghurt is increased in pH level to at least 5.2, preferably at least 6 while the range 6.6 to 6.7 is optimal. This pH increase prevents the formation of brittle and very sour curd and subsequent formation of brittle cheese. If the pH is not raised, the end product is found to have a relatively granular, non-elastic "short" texture; however, after ripening this defect diminishes.

In particular the starter culture is added in an amount of 0.1–1.5%, preferably 0.15%–0.55% by weight of the total mass.

From Revue Laitiere Francaise 445, p.56–57 (1985) a method is known for the preparation of cheese from recombined milk. As a starter culture a mixture is used of 50% mesophilic culture (*Streptococcus lactis*) and 50% thermophilic (yoghurt) culture (*Streptococcus thermophilus*+ *Lactobacillus bulgaricus* or *Streptococcus thermophilus*+*Lactobacillus helveticus*). The mesophilic culture is a culture wherein no aroma forming bacteria are present. In total 2.2% culture is added which means that only 1.1% yoghurt is added. With the method according to the invention a so-called BD culture is used containing two aroma forming species in combination with a yoghurt culture. Although this reference describes a pH correction it concerns a downward correction, contrary to the upward correction according to the present method. Prior to coagulation, pre-acidification of the milk is applied.

From WO-A-82 03971 the use of a combination of normal cheese starter culture and yoghurt culture is known for the preparation of low-fat cheese. According to this method the normal starter culture and the yoghurt culture is used approximately in the same amount. In addition to the normal starter culture and yoghurt culture also *Lactobacillus casei* is used.

The invention further provides a cheese product of the kind of a hard or semi-hard cheese in the preparation of which yoghurt culture is used, characterised in that the cheese possesses a Gaba/Glu (gamma amino butyric acid/ glutamic acid) ratio of at least 0.1, said cheese product being obtainable by the method according to the invention.

The Gaba/Glu ratio relates to the ratio of gamma amino butyric acid to glutamic acid and is preferably at least 0.25. Although Applicant does not wish to limit the present application to any mechanism, tests showed the following. A substantial amount of $CO_2$ is produced during ripening of the cheese according to the invention by decarboxylation of free amino acids. For instance the decarboxylation of glutamic acid (Glu) yields gamma amino butyric acid (Gaba), in which reaction process $CO_2$ is formed. Said carbon dioxyde production accounts for the striking appearance of the cheese possessing large holes (eyes).

In particular the cheese product comprises eyes with a total volume of at least 4% (v/v) of the total cheese volume.

It is further preferred to pasteurise the milk before adding the yoghurt. Pasteurisation can be carried out, for example, by holding the milk at 72° C. for 30 s.

The invention will be illustrated below with the aid of examples of methods according to the invention with which four cheese products A, B, C and D were prepared.

The methods were based on a generally known method for the preparation of Gouda 48+ using cows milk. The various process variables and the amounts of the constituents used are shown in Tables 1–3. Overall, the methods comprise the following steps: Firstly, yoghurt was added to pasteurised milk, but in the case of cheese D the mixture of yoghurt and milk was pasteurised after addition of the yoghurt (30 s at 72° C.). If necessary, the pH of the acidified milk product or the mixture of acidified milk product/milk was corrected using a 3% food-grade NaOH solution. The mixture was then allowed to curdle after adding coagulant, and other additives, including calcium chloride, sodium nitrate and starter, the latter in two different amounts, that is to say the customary amount of starter for the Gouda 48+ method and half of this amount. The curd were then processed in accordance with a standard cutting/stirring programme (Gouda 48+ method). After a portion of the whey had been drained off, the curd particles were washed with an amount of water (±10% extra compared with cheese A), the post-heating temperature being 32° C. in accordance with the regular Gouda 48+ method. The final steps were pressing in accordance with the Gouda 48+ method, acidification to pH 5.8, brining and storage for maturing.

A is a reference cheese, which was produced in accordance with the standard Gouda 48+ method without the addition of yoghurt.

B is a cheese which was obtained using 10% by weight of yoghurt and without pH correction prior to curdling and without yoghurt pasteurisation.

C is a cheese which was obtained using 10% by weight of yoghurt and with pH correction to pH 6.65, but without yoghurt pasteurisation.

D is a cheese which was obtained using 10% by weight of yoghurt, pH correction to pH 6.70 and with pasteurisation of the yoghurt/milk mixture.

The process data for the respective cheeses and the analytical data for the cheeses obtained are given in Tables 1–3. All percentages indicated are percentages by weight. Cheese C was found to be of the best quality, both with respect to the taste and with respect to the consistency. This cheese had a refreshing tart, sweet, nutty and strong taste (denoted as "yoghurt cheese taste"), a smooth texture and the striking appearance resulting from the presence of relatively large holes.

The starter culture used in the examples is BOS. This is a culture comprising *Streptococcus lactis, Streptococcus cremoris, Leuconostoc cremoris* and *Streptococcus diacetylactus*.

Table 4 shows the results of the quality assessment of the cheeses by a test panel after maturation for 12 weeks. In this table, N is the number of persons in the panel. The persons gave an assessment on a scale of 0 to 5 and the averages of these assessments are shown in the table. Cheese C is obviously the cheese with the best overall quality.

Table 5 shows the results of the quality assessment of cheeses by the same test panel after maturation for 12 weeks. The cheeses were all prepared by the same method as used for the preparation of cheese C although the yoghurt addition to the cheese milk was varied, i.e. 1% (w/w), 5% (w/w), 10% (w/w), 15% (w/w), 20% (w/w) and 25% (w/w). It should be noted that the holes get the appearance of irregular cavities with yoghurt additions of 20% and higher.

Table 6 shows the characteristic qualities of cheese C with varying % BOS addition to cheese milk. From this table it is clear that when yoghurt culture and a mesophilic culture like BOS are used together the characteristic eye formation takes place in the cheese product. Further it appears that 0.35% BOS (w/w) gives the best taste according to an expert panel.

Table 7 gives the results of tests on the gaba/glu ratio of cheese C with time as well as of an ordinary Gouda cheese. It appears that the gaba/glu ratio is high in cheese C, in any case very much higher than in Gouda cheese. The decreasing gaba/glu ratio in cheese C with time shows that decarboxylation of glutamic acid into gamma amino butyric acid, in which reaction process the $CO_2$ is formed which probably causes the eye-formation, takes place already in the first 15 days.

TABLE 1

PRODUCT DESCRIPTION

| Cheese | Constituent CaCl$_2$ (g) | Constituent NaNO$_3$ (g) | (% yoghurt) | pH of yoghurt before addition | process | Starter type | Starter conc. (%) | Starter pH | MILK Coagulant (%) | MILK fat (%) | MILK amount (l) | 1st Whey fat (%) | 2nd Whey fat (%) |
|---|---|---|---|---|---|---|---|---|---|---|---|---|---|
| A | 60 | 50 | — | | | BOS | 0.7 | 4.34 | 0.030 | 3.35 | 250 | 0.30 | 0.15 |
| B | 60 | 50 | 10 | 3.83 | | BOS | 0.35 | 4.32 | 0.030 | 3.35 | 250 | 0.30 | 0.15 |
| C | 60 | 50 | 10 | 6.65 | | BOS | 0.35 | 4.32 | 0.030 | 3.36 | 250 | 0.40 | 0.15 |
| D | 60 | 50 | 10 | 6.70 | pasteurised | BOS | 0.7 | 4.28 | 0.030 | 3.36 | 250 | 0.40 | 0.15 |

TABLE 2

PROCESS VARIABLES

| Cheese | Curdling temp. | Curdling time (min) | 1st Whey tapped (l) | Wash-water added (l) | Post-heating temp. | Post-heating time (min) | Acidification time (min) | Pickling time (h) | Cheese weight °Be | Cheese weight pH | Cheese weight before pressing | Cheese weight after pressing | Cheese weight after pickling |
|---|---|---|---|---|---|---|---|---|---|---|---|---|---|
| A | 29 | 35 | 110 | 110 | 32 | 8 | 40 | 24 | 18 | 4.80 | 6.73 | 5.80 | 5.66 |
| B | 29 | 13 | 120 | 120 | 29 | 8 | — | 24 | 18 | 4.80 | 7.21 | 6.24 | 6.12 |
| C | 29 | 57 | 120 | 120 | 32 | 8 | — | 24 | 18 | 4.78 | 6.43 | 5.67 | 5.61 |
| D | 29 | 50 | 110 | 110 | 32 | 8 | — | 24 | 18 | 4.78 | 7.32 | 6.08 | 6.05 |

TABLE 3

| Cheese | CHANGE IN pH | | | | | | ANALYTICAL CHEESE DATA | | | | | | |
|---|---|---|---|---|---|---|---|---|---|---|---|---|---|
| | Cheese milk | Acidification | Curdling | Pressing | Acidification | Pickling | Time (days) | Solids content (%) | Fat (%) | Fat in solids (%) | Protein (%) | Salt (%) | Salt in water (%) | pH |
| A | 6.71 | 6.60 | 6.59 | 5.99 | 5.80 | 5.24 | 15 | 55.3 | 25.1 | 45.4 | 24.9 | 1.99 | 4.5 | 5.38 |
| B | 6.72 | 5.80 | 5.79 | 5.10 | — | 5.06 | 15 | 47.2 | 21.4 | 45.3 | 20.9 | 2.31 | 4.5 | 4.98 |
| C | 6.71 | 6.60 | 6.60 | 5.30 | — | 5.32 | 13 | 52.8 | 22.8 | 43.2 | 24.8 | 1.97 | 4.2 | 5.21 |
| D | 6.73 | 6.60 | 6.57 | 5.61 | — | 5.28 | 13 | 54.8 | 26.6 | 48.5 | 23.4 | 2.10 | 4.6 | 5.26 |

| Cheese | ANALYTICAL CHEESE DATA | | | | | | |
|---|---|---|---|---|---|---|---|
| | Time (weeks) | Solids content (%) | Fat (%) | Fat in solids (%) | Protein (%) | Salt (%) | Salt in water (%) | pH |
| A | 8 | 56.8 | 25.8 | 45.4 | 25.6 | 2.04 | 4.7 | 5.19 |
| B | 8 | 50.8 | 23.0 | 45.3 | 22.5 | 2.55 | 5.2 | 5.18 |
| C | 8 | 55.7 | 24.1 | 43.2 | 26.2 | 2.08 | 4.7 | 5.47 |
| D | 8 | 51.3 | 24.9 | 48.5 | 21.9 | 1.97 | 4.0 | 5.37 |

TABLE 4

ASSESSMENT AFTER 12 WEEKS

| Cheese | N | Global scores | | |
|---|---|---|---|---|
| | | Consistency | Taste quality | Taste intensity |
| A | 10 | 3.9 | 3.5 | 3.6 |
| B | 10 | 2.8 | 2.2 | 3.9 |
| C | 10 | 4.4 | 3.3 | 3.3 |
| D | 10 | 3.5 | 2.9 | 3.4 |

TABLE 7

| Cheese type | Age (days) | gaba/glu |
|---|---|---|
| Cheese C | 5 | 0.33 |
| Cheese C | 15 | 1.77 |
| Cheese C | 18 | 0.86 |
| Cheese C | 28 | 0.79 |
| Cheese C | 56 | 0.70 |
| Gouda | 56 | 0.01 |

TABLE 5

Expert panel results (12 weeks)

| % Yoghurt (w/w) | Consistency 5 pt scale | Taste quality 5 pt scale | Taste intensity 5 pt scale | Eye formation[1] | Yoghurt cheese taste | mesoph. culture to Yoghurt cult. ratio |
|---|---|---|---|---|---|---|
| 1 | 2.9 | 2.5 | 2.9 | − | − | 0.417 |
| 5 | 2.9 | 3.2 | 2.9 | ± | ± | 0.084 |
| 10 | 3.6 | 3.5 | 3.8 | + | + | 0.042 |
| 15 | 2.7 | 3.0 | 2.6 | + | ± | 0.028 |
| 20 | 2.8 | 2.8 | 3.4 | +* | − | 0.021 |
| 25 | 2.0 | 2.0 | 3.0 | +* | − | 0.015 |

[1]Eye formation:
− less than 2% (v/v)
± 2 to 6% (v/v)
+ 6 to 10% (v/v)
*Irregular cavities

TABLE 6

Expert panel results (12 weeks)

| % BOS (w/w) | Consistency 5 pt scale | Taste quality 5 pt scale | Taste intensity 5 pt scale | Eye formation[1] | Yoghurt cheese taste |
|---|---|---|---|---|---|
| 0 | 3 | 2.8 | 3.6 | − | − |
| 0.35 | 3.6 | 3.5 | 3.8 | + | ++ |
| 0.7 | 3 | 2.9 | 3.5 | + | + |

[1]see Table 5

We claim:

1. Method for preparing a hard or semi-hard cheese product, comprising the following steps:
   (a) adding a starter culture and from 5% to 25% of yoghurt to milk;
   (b) curdling the mixture obtained in step (a);
   (c) after curdling, cutting the curd formed and separating off the whey to form a cheese mass; and
   (d) pressing the cheese mass,
wherein the yoghurt contains live yoghurt bacteria comprising *Streptococcus thermophilus* and *Lactobacillus bulgaricus* and the weight ratio of the starter culture to yoghurt bacteria is from 0.01 to 0.04.

2. Method according to claim 1, characterised in that the starter culture/yoghurt bacteria ratio is from 0.30 to 0.02.

3. Method according to claim 1, characterised in that the starter culture comprises at least one aroma former.

4. Method according to claim 1, wherein the pH of the yoghurt prior to addition to the cheese milk is increased to at least 5.2.

5. Method according to claim 4 wherein the pH of the yoghurt prior to addition to the cheese milk is increased to at least 6.

6. Method according to claim 5 wherein the pH of the yoghurt is in the range of from 6.6 to 6.7.

7. Method according to claim 1, characterised in that the starter culture is added in an amount of 0.1–1.5%, by weight of the total mass.

8. Method according to claim 7 wherein the starter culture is added in an amount of from 0.15 to 0.55% by weight of the total mass.

9. Cheese product of the kind of a hard or semi-hard cheese in the preparation of which yoghurt bacteria are used, characterised in that the cheese possesses a Gaba/Glu (gamma amino butyric acid/glutamic acid) ratio of at least 0.1, said cheese product being obtainable by the method according to claim 1.

10. Cheese product according to claim 9, characterised in that the Gaba/Glu ratio is at least 0.25.

11. Cheese product according to claim 9, characterised in that the cheese product comprises eyes with a total volume of at least 4% (v/v) of the total cheese volume.

12. Method according to claim 1 wherein the yoghurt is present in the amount from 8 to 15% by weight of the total mass.

13. Method according to claim 1 wherein the yoghurt is present in the amount from about 10% by weight of the total mass.

* * * * *